(12) United States Patent
Jonckheere et al.

(10) Patent No.: US 7,235,026 B2
(45) Date of Patent: Jun. 26, 2007

(54) UTILITY MACHINERY AND ASSOCIATED CONTROL ARRANGEMENTS

(75) Inventors: Marc R. M. Jonckheere, Snellegem (BE); Marc E. Ramon, Brugge (BE)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 11/402,070

(22) Filed: Apr. 11, 2006

(65) Prior Publication Data
US 2006/0276282 A1 Dec. 7, 2006

Related U.S. Application Data

(62) Division of application No. 10/464,249, filed on Jun. 18, 2003, now Pat. No. 7,059,982.

(51) Int. Cl.
*F16H 55/56* (2006.01)
*F16H 61/32* (2006.01)
*F16H 55/52* (2006.01)

(52) U.S. Cl. .......................... 474/29; 474/40
(58) Field of Classification Search .............. 474/8, 474/29, 30–31, 35, 40, 45–46, 36
See application file for complete search history.

(56) References Cited

U.S. PATENT DOCUMENTS

| 2,398,235 | A | * | 4/1946 | Luenberger | 474/40 |
|---|---|---|---|---|---|
| 2,541,529 | A | | 2/1951 | McVicker | |
| 2,578,127 | A | * | 12/1951 | Collins | 474/25 |
| 2,593,163 | A | | 4/1952 | Matheson | |
| 2,600,416 | A | | 6/1952 | Millard | |
| 2,636,396 | A | * | 4/1953 | Reeves | 474/40 |
| 3,009,363 | A | * | 11/1961 | Kohn et al. | 474/40 |
| 3,088,326 | A | * | 5/1963 | Woodward, Jr. | 474/40 |
| 3,109,315 | A | * | 11/1963 | Luenberger | 474/40 |
| 3,110,189 | A | | 11/1963 | Steuer | |
| 3,380,315 | A | | 4/1968 | Emerson | |
| 3,386,299 | A | | 6/1968 | Brown et al. | |
| 5,176,353 | A | | 1/1993 | Aihara et al. | |

FOREIGN PATENT DOCUMENTS

| DE | 25 31 614 | 3/1977 |
|---|---|---|
| EP | 1074681 A | 2/2001 |
| JP | 54-3983 A | 1/1979 |
| JP | 195223 | 11/1983 |
| JP | 294251 | 12/1986 |
| JP | 159228 | 6/1996 |
| JP | 26199 | 1/1998 |

* cited by examiner

*Primary Examiner*—Marcus Charles
(74) *Attorney, Agent, or Firm*—Rebecca Henkel

(57) ABSTRACT

A method is provided for bearing a pitch or grip of a belt running between a pair of opposing faces of respective first and second sheave members of a power transmission device. The method includes moving the second sheave member axially in relation to the first sheave member by translating to the second sheave member, in a form of linear movement, rotation of a control rod disposed substantially at right angles to a line of axial spoke of the second sheave member.

5 Claims, 12 Drawing Sheets

UTILITY MACHINERY AND ASSOCIATED CONTROL ARRANGEMENTS

CROSS REFERENCE TO RELATED APPLICATIONS

This Patent Application is a Divisional of U.S. application Ser. No. 10/464,249, filed on Jun. 18, 2003, now U.S. Pat. No. 7,059,982, issued on Jun. 13, 2006 entitled "Utility Machinery And Associated Control Arrangements" and having Marc R. M. Jonckheere et al. as the Applicant.

FIELD OF THE INVENTION

The present invention relates to utility machinery and in particular, but not exclusively, to arrangements for the control of power transmission in such machinery.

BACKGROUND TO THE INVENTION

It is known to provide utility machinery with a number of belt and/or chain drives to power sub-systems for processing material handled by the machine or for operating other sub-systems of the machine. One example of the sort of utility machinery which is commonly fitted with multiple belt drives, is an agricultural crop gathering and processing vehicle, such as a self-propelled combine harvester or a forage harvester.

While a chain drive can offer high efficiency in power transmission, this form of drive tends to have quite a high maintenance requirement, e.g. in terms of chain lubrication. A more significant disadvantage is felt when a change in transmission ratio is required, under which circumstances it may prove necessary to fit one or more gearboxes into the drive line or to provide multiple sprocket sets and thereby add weight, cost and complexity.

In many cases, it has been found useful to use a belt drive rather than a chain. Belt drives comprise a belt that encompasses a driver pulley and a driven pulley. They usually run dry and changes in ratio can be achieved without necessarily using a gearbox. Changes in ratio may be achieved using a variable speed drive mechanism, for example in the form of a stepless transmission of the type often referred to as a continuously variable or infinitely variable transmission (CVT/IVT). In many belt drive transmissions of this general type, the ratio is varied by changing the distance between opposing members forming sheaves of a pulley. The sheaves are moveable axially relative to each other and this varies the pitch diameter and/or grip of a belt running between them. Commonly the sheaves of the driven pulley are biased towards each other by a resilient means and an actuator is used to control the relative position of the sheaves of the driven pulley.

If both sheaves move, the pitch or grip variation imparted to the running sides of the belt may be considered to be double acting. In many cases, however, one of the sheaves is positionally fixed axially and the other sheave moves axially in relation to it within the limits of a predetermined stroke. The length of the predetermined stroke and the angle of the sheave surface define the range of pitch or grip imparted to the belt. While the moveable sheave can be displaced axially with respect to the positionally fixed one, it is often fixed in respect of relative rotation. This is sometimes achieved by a splined connection between a hub carrying the fixed sheave and a sleeve carrying the moveable sheave.

In some known belt drive variators, the moveable sheave is biased towards the axially fixed sheave by means of a spring. One such arrangement is disclosed in U.S. Pat. No. 3,616,706 in which a through-bolt is used to pre-load the spring and exert a compressive force gripping the belt against slippage. One disadvantage of such an arrangement is that the casing holding the spring sticks out to one side. If the variator is to be positioned close to a frame, such as a side panel of a combine harvester, the spring casing may have be positioned outboard so as to provide preferred belt alignment. This will incur a width penalty equal to the depth of the spring casing. As the spring is pushing against the moveable sheave, this arrangement would therefore mean that the moveable sheave is also outboard and its associated control linkages may be both vulnerable to damage and may still further increase width or interfere with other mechanisms. It might in some cases be preferable to position the moveable sheave inboard and therefore facing the frame. Such an arrangement, however, is difficult to meet because the space available between the variator and the frame may not be wide enough to accommodate the spring housing or associated control linkages.

The torque, and hence the power a belt can transmit, is proportional to the axial load on the belt sides. If the load is too low, slippage and hence loss of power will occur. However, the load may not be increased infinitely, because the lifetime of a belt decreases dramatically if the axial load is too high. Hence there is a need for adjustment of the axial load on the sheaves in response to the transmitted power or torque.

A basic arrangement such as that proposed in U.S. Pat. No. 3,616,706 or GB-1555162 makes some provision for preventing problems of belt slip. The arrangement of GB-1555162 transmits power via the through-bolt that rotatably carries both sheaves. Splines assure a fixed rotational position of the sheaves relative to each other. The through-bolt transmits power via cam members adapted to push the opposing sheave halves forming the pulley towards each other in the event of increased power transmission. This tightens the grip on the sides of the belt that contact the two sheaves forming the pulley. It is a disadvantage of the proposal in GB-1555162 that this cam mechanism is external to the pulley, where it is exposed to environmental hazards such as dust or grease. This mechanism also operates by constantly pushing the moveable sheave against the fixed sheave, which may limit the life of some components such as thrust bearings.

When the speed of the driving pulley is decreased suddenly, the inertia of the driven components may temporarily drive the belt and the torque is reversed. The cam members lose contact and may be rotated a substantial distance from each other. When the speed of the driving pulley is increased again, the torque returns to its normal direction and the cam surfaces hit each other forcefully. Such backlash causes premature wear to the cams and their supports.

In addition, it may be noted that the sensitivity of the control mechanism at high belt pitch is the same as it is at low belt speeds and this may limit the changes in pitch and associated speed changes which can be made per increment in sheave separation.

Commonly the driven pulley is provided with a control mechanism for positively adjusting the distance between the driving pulley sheaves and hence the pitch of the belt. Such control mechanism is provided at the outside of the pulley, such that it enlarges the overall width of the drive variator and hence of the machinery it is mounted on.

In some known utility machinery, use of multiple belt drives can lead to increasing width as drives stack up one outside the other. This can lead to problems achieving overall width limits for road transport, e.g. three meters, whilst still providing a sufficiently wide frame for materials handling. One example of such a situation arises in agricultural vehicles and in particular some of those having a plurality of transverse belt and/or chain driven shafts arranged for tangential flow of harvested crop between, over or under drums, knives and similar processing equipment driven by those shafts. In EP-1044598, for example, the thresher part of a combine harvester is in the form of a multiple drum thresher operating in tangential flow with at least four drums. All the drums are connected in constant transmission ratios and are driven by a variable speed drive mechanism in the form of a speed variator. In this arrangement, however, fixed ratio driven wheels are positioned behind an engine driven input wheel and this might lead to complicated and lengthy ratio changes.

It is generally desirable in the art to develop systems which are compact and effective and to reduce one or more of the parts count, complexity and associated cost of providing, using and/or maintaining drive arrangements such as those used to drive components of a utility vehicle.

SUMMARY OF THE INVENTION

It is an object of the present invention to provide improved utility machinery and improved control mechanisms for such machinery. It is also a further object of the present invention to provide methods for operating such improved machinery and mechanisms.

Accordingly, the present invention provides a power transmission device for utility machinery, towed or self-propelled, the device including:

a) a sleeve supporting a first sheave member having a first face;
b) a hub received through said sleeve and moveable axially in relation thereto, said hub supporting a second sheave member having a second face that opposes said first face such that said first and second faces define therebetween a groove adapted to receive a belt and relative axial movement between said sleeve and said hub being adapted to vary at least one of pitch diameter and grip imparted to said belt from said sheaves; and
c) an actuator mechanism adapted, through control of relative axial displacement between said sleeve and said hub, to vary at least one of said pitch and grip, said actuator mechanism comprising a control rod disposed substantially perpendicularly to the line of action of said axial displacement and connected to said hub through a link mechanism, said control rod being adapted to move and said link mechanism being adapted to translate movement of said control rod into relative axial displacement of said hub.

Said sleeve may be axially substantially fixed in position and said hub may be axially moveable, such that variation of the width of said groove is performed by single-sided displacement of said second sheave performed through said actuator mechanism.

Said control rod may move by rotation. Said control rod may be rotated by means of a motor, which motor is preferably reversible. Said motor may comprise an electric motor driving through reduction gearing.

Said link mechanism may include a threaded boss and said control rod may comprise a threaded portion that is engaged in use with said boss and adapted to translate rotation of said control rod into linear displacement of said boss along said control rod.

Said link mechanism may further comprise a link arm connected to said boss via a first pivot and connected to said hub or a thrust member engaging said hub via a second pivot, said first and second pivots being spaced apart along said link arm.

Said link mechanism may further comprise a swinging arm that is connected in the region of one end to said link arm by a third pivot located in between said first and second pivots and in the region of its other end is adapted to pivot about a positionally fixed fulcrum. Said fulcrum may be fixed in a position substantially in line with a center line that runs through said control rod and said boss. Said fulcrum may be fixed in a position substantially along the line of action of said relative movement of said hub.

Said link arm may be restricted to movement along a predetermined curvilinear path by movement of said boss along said control rod combined with an arc scribed by said swinging arm. The length of the swing arm and the position of the third pivot may be chosen such that the first pivot and the second pivot move along paths that are perpendicular to each other. The sum of the angle between the centerline of the control rod and the centerline of the swinging arm and the angle between the centerline of the hub and the centerline of the swinging arm may be substantially equal to a right angle at substantially all levels of displacement of said hub.

Said link arm may comprise a heel portion adapted to abut against a stop member in such a manner as to limit the arc of travel of said link arm in at least one direction. Said limited arc of travel of said link arm may limit correspondingly a stroke of travel of said hub available during said relative displacement, said hub including a taper roller bearing and said stroke of travel of said hub being limited such that separation of said taper roller bearing does not exceed a predetermined level.

Said arc of travel of said link arm may limit correspondingly the distance along said control rod that is available for travel therealong of said boss. The device may further comprise an adjuster mechanism for controlling travel, backlash, free-play or slack in at least a portion of said actuator mechanism. The limit to the arc of travel of the link arm and/or threaded boss may be implemented by means of travel limiter positioned either side of said threaded boss, such as adjusting nuts and associated locking nuts. Such adjusting and locking nuts may then be used to take up said backlash, free-play or slack.

In the case of an increase to said pitch or grip, said relative movement of said hub may be imparted by a pushing force. Said relative movement between said sheaves may be imparted and constrained by actuation of said actuator mechanism between a bearing housing of a shaft upon which said hub runs and a thrust bearing of said second sheave.

The mechanical advantage of said actuator mechanism may be greatest when said sheaves are closest together, such that the finest control in said relative movement is achieved in the region of the highest belt pitch diameter. The device may further comprise a feedback arrangement adapted to provide feedback of the speed output thereof.

The device may comprise a variator of a continuously or infinitely variable transmission. Said device may be used in a drive arrangement of an agricultural machine, such as a combine harvester or a forage harvester. Said device may be positioned alongside a frame member or panel of a said agricultural machine and said control rod may run in between said panel and said sheaves.

The present invention also provides a method of varying the pitch or grip of a belt running between a pair of opposing faces of respective first and second sheave members of a power transmission device, the method including moving said second sheave axially in relation to said first sheave by translating to said second sheave, in the form of linear movement, rotation of a control rod disposed substantially at right angles to a line of axial stroke of said second sheave.

The present invention also provides a power transmission device for utility machinery, towed or self-propelled, the device including:
a) a hub supporting a first sheave member having a first face;
b) a sleeve received on said hub and moveable axially and rotationally in relation thereto, said sleeve supporting a second sheave member having a second face that opposes said first face such that said first and second faces define therebetween a groove adapted to receive a belt and relative axial movement therebetween being adapted to vary at least one of the pitch and grip of said belt; and
c) a torque dependent pressure device comprising at least one wedge member disposed on one of said sleeve and said hub and an associated wedge track disposed on the other of said sleeve and said hub, said wedge member being arranged in use in the event of belt slippage to rotate said sheave members relative to each other and to move along said wedge track in such a manner as to force said sheaves towards each other and thereby to increase grip on said belt,
wherein said wedge member and said wedge track are substantially enclosed in a casing defined within said power transmission device by one or more of said sheaves, hub and sleeve.

One advantage of this arrangement is to provide protection for said wedge and track members from environmental hazards.

In the event of an increase in torque transmission, said wedge member and said wedge track may be adapted to move said sheaves axially towards each other by means of a pulling action.

In the event of a decrease in torque transmission, said wedge member and said wedge track may be adapted to allow said sheaves to move apart. Said torque dependent pressure device may be provided with lubrication between said wedge member and said wedge track. Said lubrication may comprise a lubricant common with said hub. Said lubricant may comprise a hub grease or oil supplied to said torque sensitive pressure device centrifugally after initial use in lubricating said hub.

Said wedge member may include a wear member, preferably replaceable, that is adapted to run on a contact surface of said wedge track. Said wedge member may be disposed on said hub and said wedge track may be disposed on said sleeve. Said wear member may comprise a polyacetol material.

An angle of slope of a contact region between said wedge member and said wedge track may be substantially constant. An angle of slope of a contact region between said wedge member and said wedge track may be configured in a predetermined relationship to an operating range of belt pitch variation achievable in use between said sheave members.

Said torque dependent pressure device may further comprise a backlash limiter. Said backlash limiter may comprise an abutment surface which is adapted to capture said wedge member in a slot defined between said wedge track and said backlash abutment surface. Said hub may be axially substantially fixed in position and said sleeve axially moveable, such that variation of the width of said groove is performed by single-sided displacement of said second sheave.

Said second sheave may be biased towards said first sheave by preloading a bias element, preferably a coil spring. The width of said groove and the associated pitch or grip of said belt may be controlled by joint action between said torque dependent pressure device and said bias element.

Said bias element may be preloaded by being compressed using a threaded compressor moveable along a hole defined in said hub or the shaft and supporting therein an internal thread along a portion thereof. Said internally threaded portion may comprise an insert fixed in position in said clearance hole. Said insert may comprise a sleeve threaded internally for said compressor and provided externally with a thread adapted to engage with a thread formed on the inner side of said clearance hole and preferably trapped by a retaining means against movement away from a substantially fixed position in said threaded portion of said clearance hole.

The present invention also provides a drive transmission arrangement for a utility vehicle, comprising:
a) a plurality of shafts adapted to run substantially parallel to each other and substantially transverse to forward motion of said vehicle, one or more of said shafts being adapted to operate materials handling equipment;
b) a rotational drive to an input wheel drivingly connected to a first said shaft;
c) a first variable pitch drive transmission device drivingly connected to said first shaft on a first side of said vehicle and adapted to power a first drive belt;
d) a second variable pitch drive transmission device drivingly connected on said first side of said vehicle to a second said shaft and by said first drive belt to said first variator;
e) a first fixed pitch drive wheel drivingly connected to said second shaft on a second side of said vehicle, opposite to said first side, and adapted to power a second drive belt; and
f) a second fixed pitch drive wheel drivingly connected to a third said shaft on said second side of said vehicle and by said second drive belt to said first fixed pitch drive wheel at a fixed ratio.

Said input wheel may be disposed on said first side of said vehicle. Said input wheel may be disposed outboard of said first variator.

Said rotational drive input to said input wheel may be provided from a direct drive output of a substantially constant speed prime mover.

Said first and/or second fixed pitch drive wheels may be interchangeable with each other and/or with further fixed pitch drive wheels so as to alter a fixed drive ratio between said second and third shafts.

One or more pieces of said materials handling equipment may comprise tangential processing drums adapted to rotate and to process material in a tangential flow and preferably rearwards with respect to a direction of travel used by said vehicle to gather in said material.

Said vehicle may comprise an agricultural harvesting machine, such as a combine harvester or a forage harvester. Said first shaft may comprise an intermediate shaft of said agricultural harvesting machine. Said second shaft may comprise a beater drum shaft of said agricultural harvesting machine. Said third shaft may comprise a thresher drum shaft of said agricultural harvesting machine.

DETAILED DESCRIPTION OF A PREFERRED EMBODIMENT

The drawings are schematic and the terms "front", "rear", "forward", "rearward", "right and "left" where used are determined with respect to the normal direction of movement of the machine in use. For convenience, the specific but non-limiting examples discussed herein will concentrate on agricultural machinery and in particular self-propelled combine harvesters, although it will be appreciated that similar arrangements may also be provided in other forms of agricultural crop processing machinery such as forage harvesters. Further utility machinery may comprise earth moving, processing or construction equipment. It will also be noted that the utility machinery need not be self propelled and that embodiments exist which are stationary or may be in trailer form, in either case being adapted to be driven or towed for material processing by an external input such as a tractor power take-off.

Figure 1:
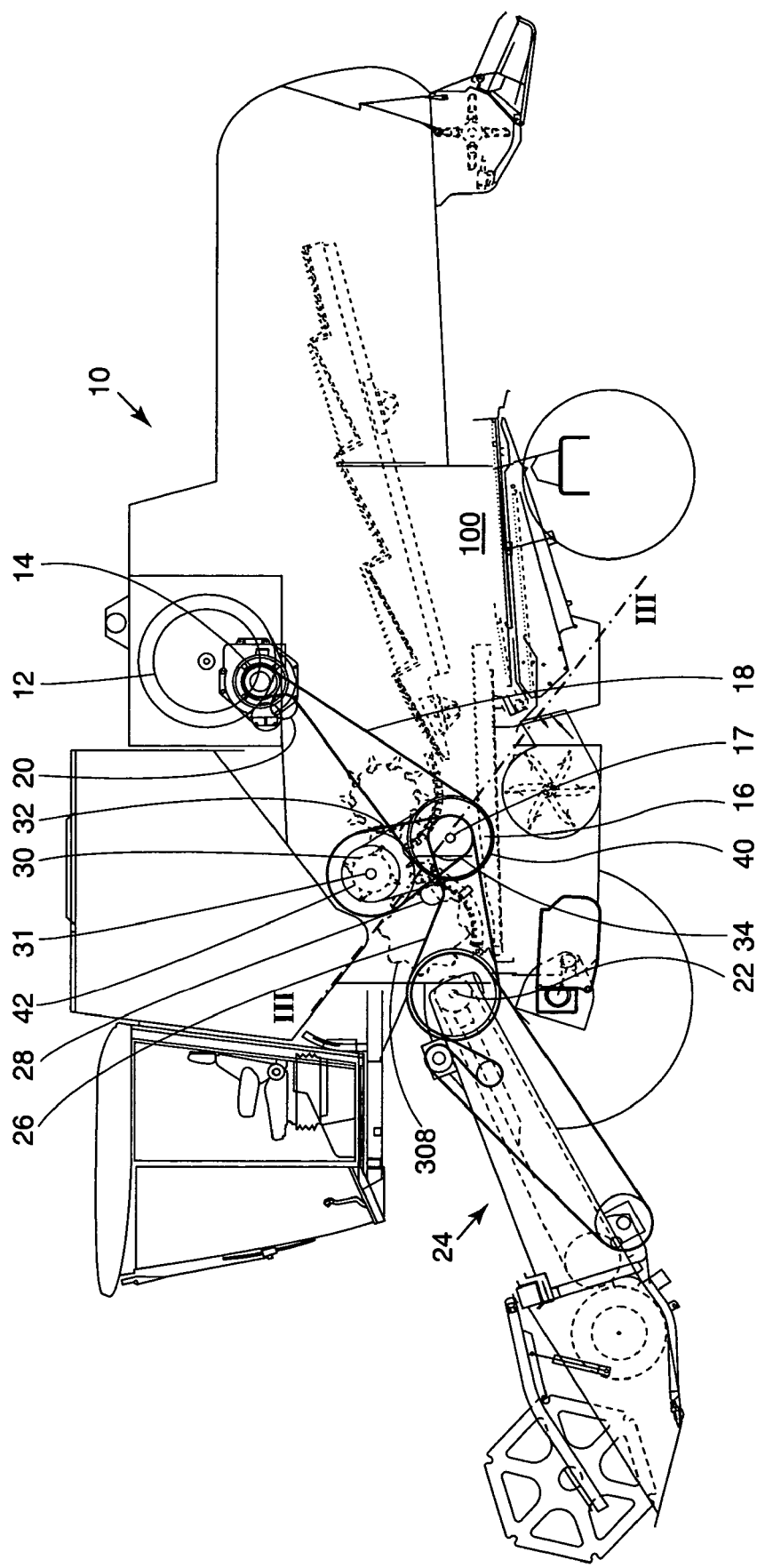
FIG. 1 is a left-hand side elevation of a utility machine.
Figure 2:
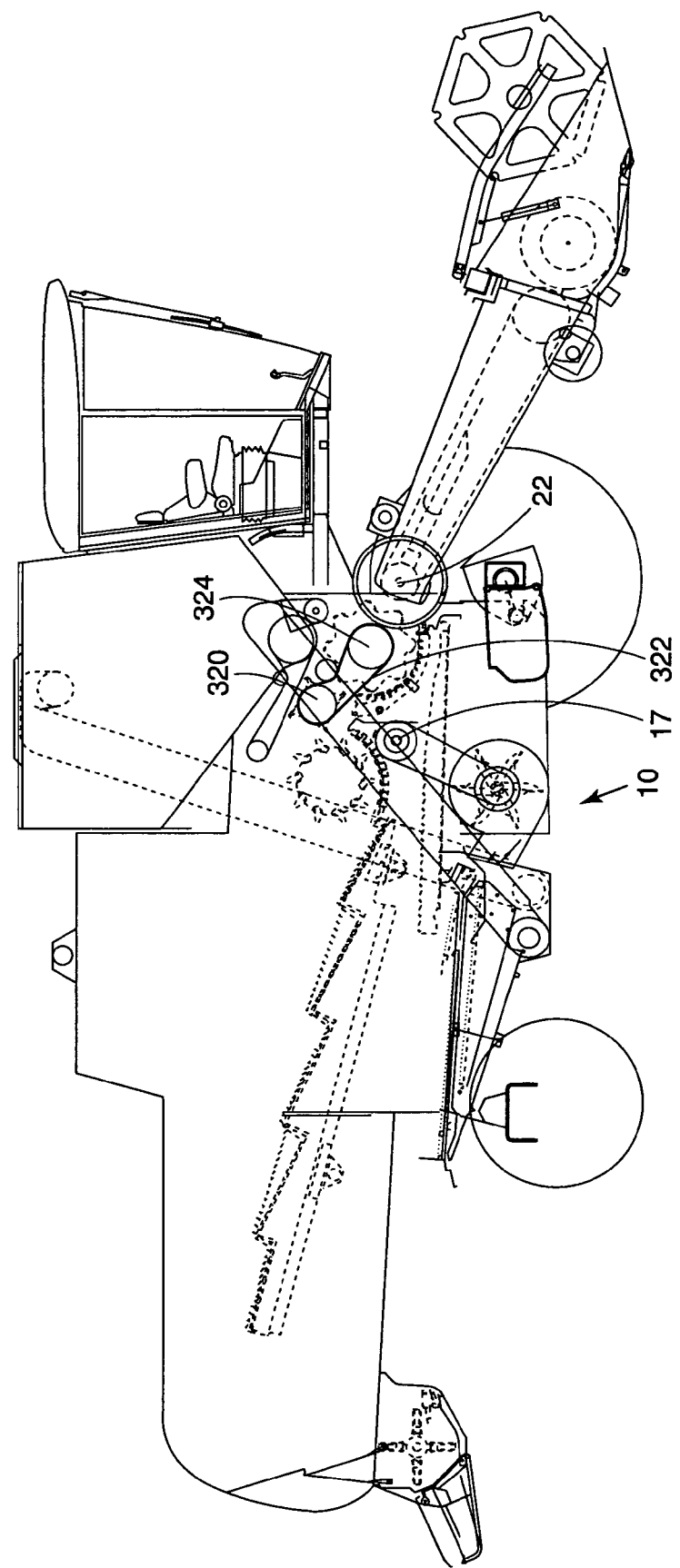
FIG. 2 is a right hand side elevation of the utility machine of FIG. 1.

Referring to the drawings, and in particular to FIGS. 1 and 2, a utility machine in the form of a self-propelled combine harvester 10 includes a prime mover in the form of a diesel engine 12. The engine 12 is preferably adapted to operate at a substantially constant speed and to vary its output torque to the meet the demand of a plurality of hydraulic drives and belt and/or chain drives powered off a directly driven engine output pulley 14. Torque output of the engine 12 may be controlled by varying its fuelling. The present invention includes other forms of prime mover, e.g. those that are not limited to operation at constant speed. The belt/chain drives are preferably disposed in substantially vertical planes, such that gravity does not pull the belts/chains off their drive wheels, which may be pulley wheels or sprocket wheels respectively as the case may be.

A fixed diameter pulley wheel 16 is drivingly connected to an intermediate shaft 17 and is supplied with drive from the engine output pulley 14 via an intermediate drive belt 18, tensioned by an intermediate drive belt idler 20. Drive to an upper shaft 22 of a feeder mechanism 24 is taken off the intermediate pulley 16 via a feeder input drive belt 26, tensioned by a feeder input drive belt idler 28. Also driven off the intermediate shaft pulley 16 is a shaft 31 of a beater drum 30, to which drive is provided by a power transmission arrangement 34. This arrangement is a variator drive comprising a drive belt 32, a first variator sheave assembly 40, driven by the intermediate shaft 17, and a second variator sheave assembly 200, driving the beater drum shaft 31.

Figure 3A:
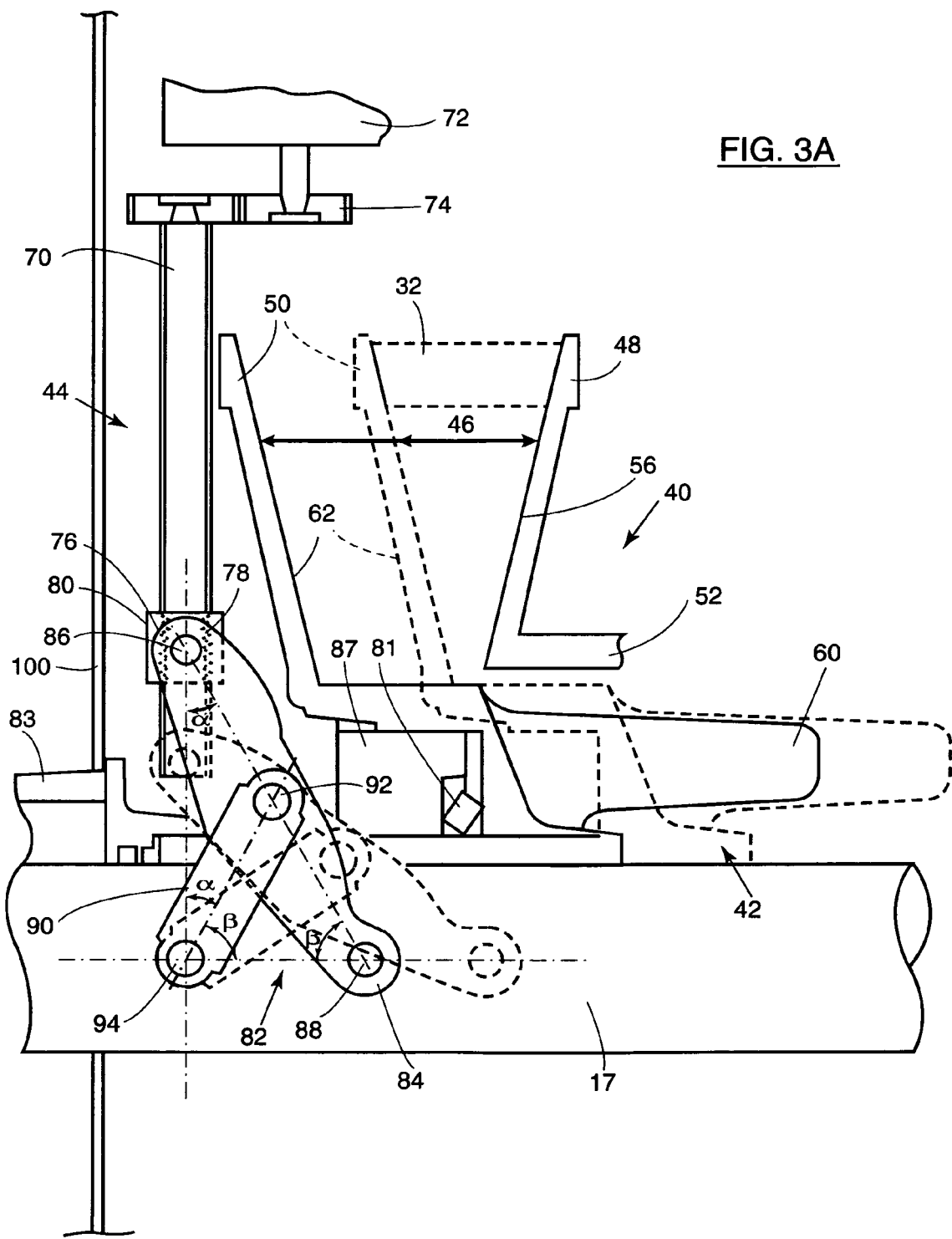
FIG. 3A is a schematic cross-section through a power transmission device according to one aspect of the present invention taken along line III-III in FIG. 1.
Figure 3B:
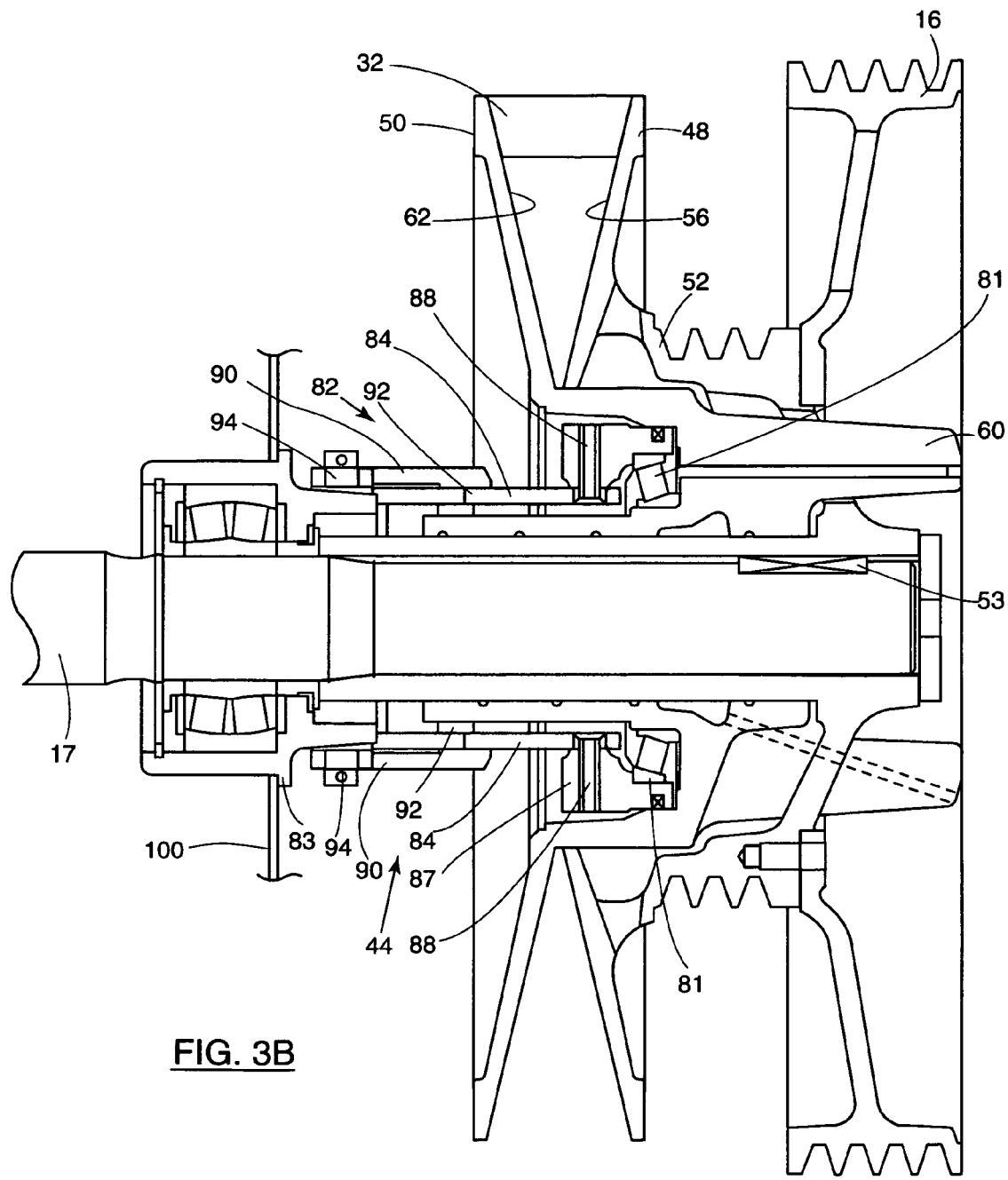
FIG. 3B is another cross-section of the device of FIG. 3A taken along a line perpendicular to line III-III in FIG. 1.

Referring now to FIG. 3, the first variator sheave assembly 40 also is associated with an actuator mechanism 44 adapted to vary the width of a groove 46 defined between first and second sheaves 48, 50. To help keep down the overall width of the combine harvester 10, the variator assembly 40 is positioned close to a side panel 100 forming part of the frame of the machine 10.

The first sheave 48 is supported on a sleeve 52 which is fixed in position by a key 53 on the shaft 17 which drives the transmission arrangement 34. The sheave 48 has a first face 56 on which in use one side of the relevant drive belt 32 runs. The second sheave 50 is supported on a hub 60 and has a face 62 that opposes the face 56 of the first sheave 48 and that provides a running surface for another side of the drive belt 32. The faces 56, 62 slope generally inwards from the top to the bottom of the variator assembly 40 and may be conical, although its cross section may take other forms such as elliptical or trapezoidal in dependence on belt form and desired speed variator characteristics.

The hub 60 is received through the sleeve 52 and is axially moveable in relation to the sleeve 52 so as to vary the width of the groove 46. Relative movement of the hub 60 and any associated variation of the width of the groove 46 between the sheaves 48, 50 is adapted to vary the pitch and/or grip imparted to the drive belt 32 by the opposing faces 56, 62. It will be noted that, because the sleeve 52 is axially fixed in position and the hub 60 moves axially, variation of the width of the groove 46 is performed by single-sided displacement of the second sheave 50.

The relative movement of the second sheave 50 is performed and controlled by the actuator mechanism 44, which is adapted to fit and operate between the frame side 100 and the second and moveable sheave 50. The actuator mechanism 44 comprises a control rod 70 that is disposed substantially perpendicularly to the line of action of axial displacement/stroke of the second sheave 50. The control rod 70 has means for moving axially. For example, the control rod may be provided with rotational drive by a reversible electric motor 72 operating through reduction gearing 74. A suitable type of motor for this purpose may comprise a wiper-motor.

The control rod 70 includes a threaded portion 76 engaged with an internal thread 78 of a threaded boss 80 adapted to ride up or down the threaded portion 76 of the control rod 70 in dependence on the direction of rotation of the control rod 70. Rotation of the control rod 70 is therefore translated into linear displacement of the boss along the control rod 70. The boss 80 is connected to a mechanism 82, e.g. a link mechanism which is adapted to translate movement (e.g. rotation) of the control rod 80 into linear movement used for relative axial displacement of the hub 60 and therefore to vary the pitch or grip imparted to the drive belt 32. Relative movement between the sheaves 48, 50 is imparted and constrained by actuation of the actuator mechanism 44 between a bearing housing 83 of the shaft 54 and a thrust bearing 81 of the second sheave.

The link mechanism 82 of the version illustrated in FIG. 3 comprises a link arm 84 in the form of a pair of fork legs which are pivotally connected to the boss 80 about a boss pivot 86 and to an annular thrust member 87 via a hub pivot 88. The link arm 84 is also connected to a swinging arm 90 via a swinging arm pivot 92 located between the boss pivot 86 and the hub pivot 88.

The swinging arm 90 pivots about a fulcrum 94 which is positionally fixed substantially in line with a centreline passing through the control rod 70 and the boss 80. The fulcrum of the swinging arm 90 is also substantially aligned with a centreline passing along the direction of relative movement between the sleeve 52 and the hub 60. The arc scribed in use by the link arm 84 is constrained to a predetermined curvilinear path by the arc which can be scribed by the swinging arm and the range of movement of the boss 80 along the control rod 70. The angle α between the centreline of the control rod 70 and the centreline of the swinging arm 90 and the angle β between centreline of the swinging arm 90 and the line of stroke of the hub 60, (i.e. centreline of the hub 60) is substantially equal to a right angle throughout the range of groove variation.

Figure 4:
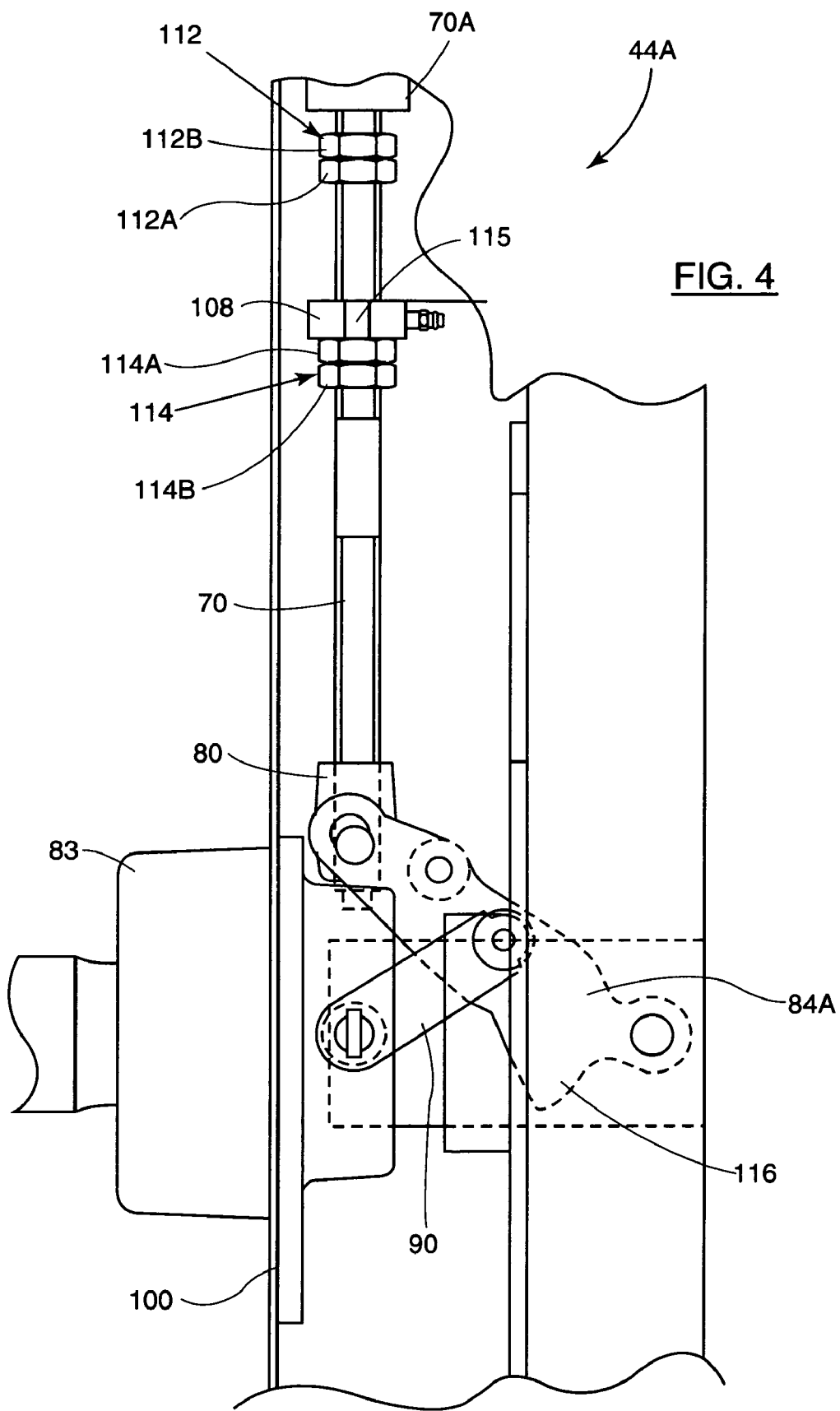
FIG. 4 is a more detailed view of part of a variation to the apparatus depicted schematically in FIG. 3.
Figure 5:
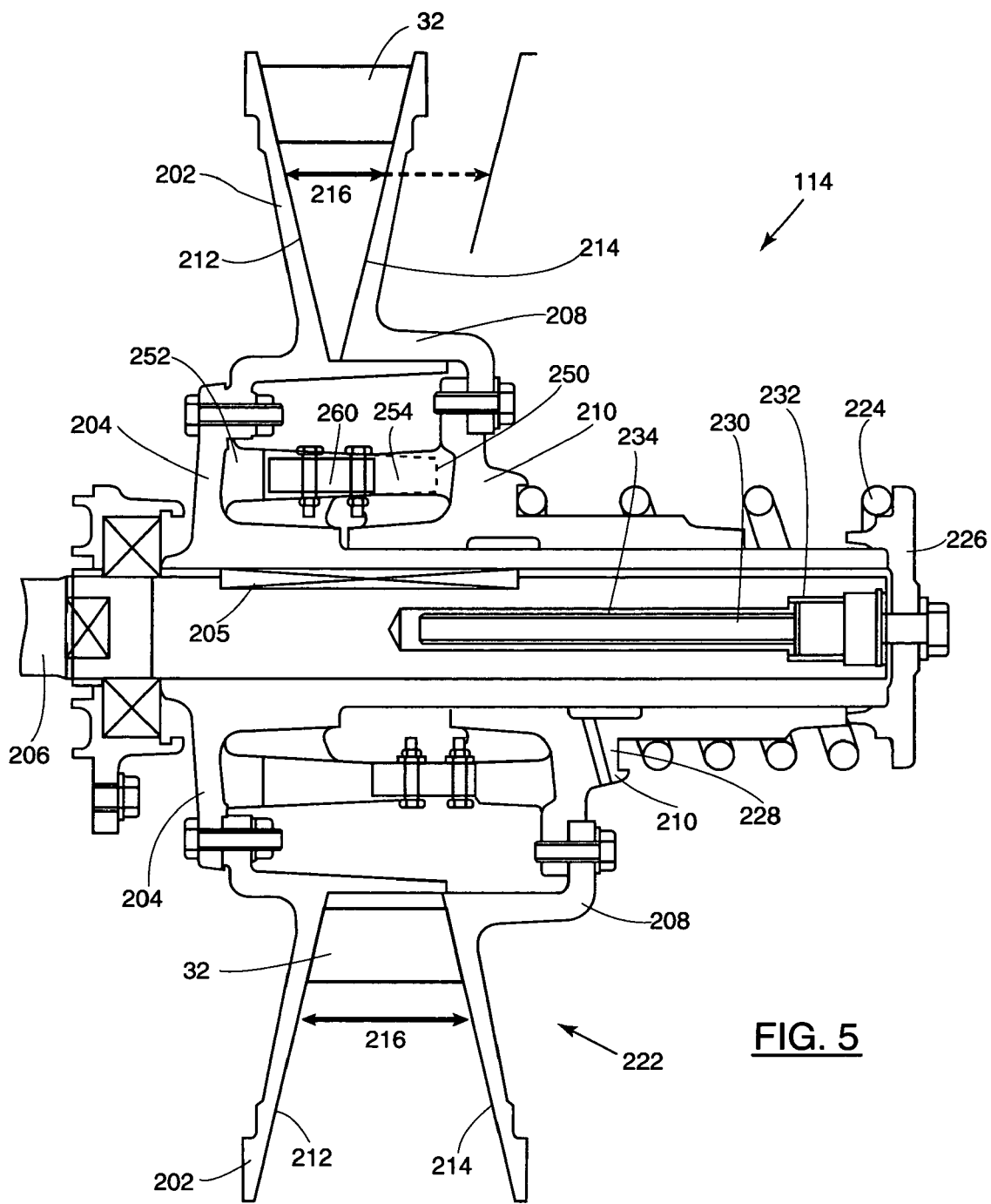
FIG. 5 is a cross section through a power transmission device according to a second aspect of the present invention.
Figure 6:
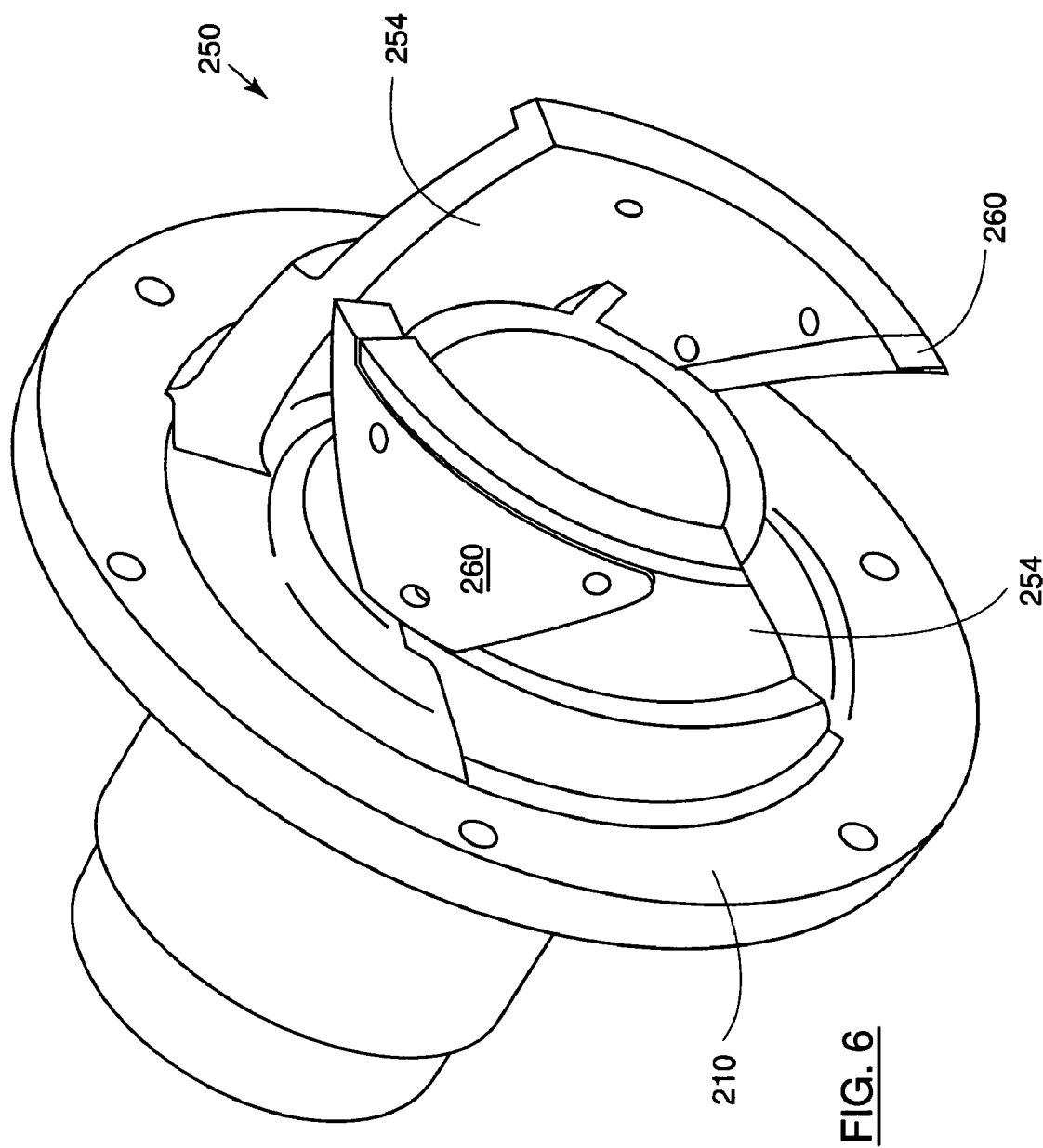
FIG. 6 is a perspective view of a first part of the device of FIG. 5.
Figure 7:
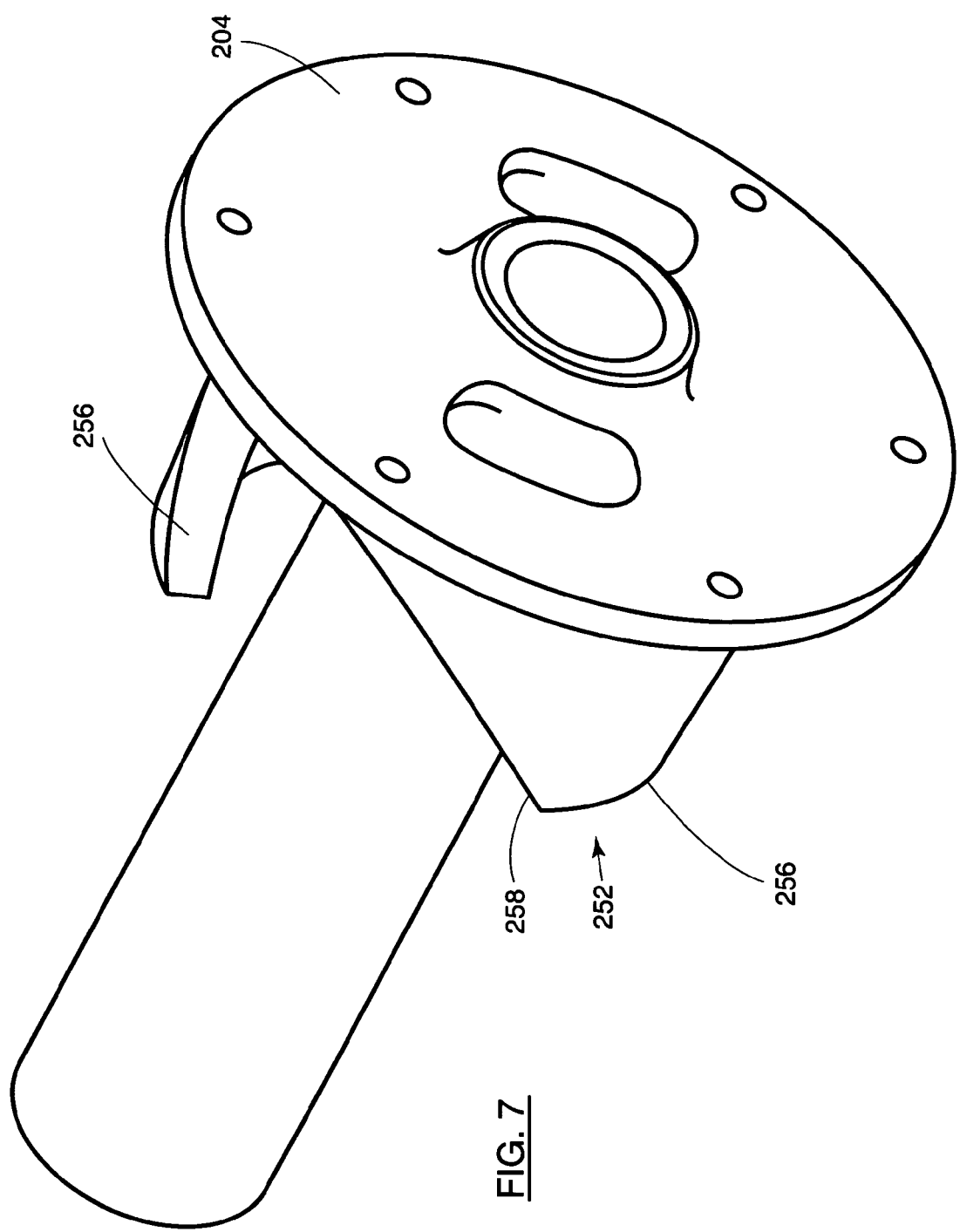
FIG. 7 is a perspective view of a second part of the device of FIG. 5, the second part being adapted to co-operate with the first part depicted in FIG. 6.

A variation to the structure of the actuator mechanism 44 illustrated in FIG. 3 is shown in FIG. 4 and analogous components are given reference numerals akin to those used in FIG. 3 with the addition of a postscript letter "A". In this version of actuator mechanism 44A partially illustrated in FIG. 4, the same principles of operation apply. However, herein a second threaded boss 108 is positioned on the control rod 70 above the link arm 84A. The threaded boss 108 runs between upper and lower travel limiters 112, 114 that form a stop mechanism/stroke limiter. A protrusion 116 that extends radially from the boss 108 is received in a slot of a panel member for keeping the boss from rotating with the control rod 70 when the motor 72 is operated. Each limiter 112, 114 comprises an adjuster nut 112A, 114A adapted to take up backlash, free-play or slack in the actuator mechanism 44A and an associated lock-nut 112B, 114B adapted to lock its associated adjuster nut 112A, 114B in place.

The actuator mechanism 44A further comprises a heel portion 116 which is formed on the link arm 84A and adapted to abut against the bearing housing 83 so as to limit the stroke of the hub 60 in at least one direction, i.e. in the direction opening the sheaves. This serves two main purposes. Firstly, it can be used to prevent sticking between an adjuster nut 112A and the second threaded boss 115. Secondly, in the event that taper roller bearings 81 are used, the heel portion 116 can be used to limit how far the bearings may be separated.

It will be noted that, among the advantages of the arrangement 44, 44A, mechanical advantage is greatest when the sheaves 48, 50 are closest together such that fine control in relative movement is achieved in the region of the highest belt pitch diameter. Optionally, feedback of substantially instantaneous speed of the controlled element, e.g. drum speed, may be provided to either a user or a control apparatus by using a speed sensor reading off the drum 30 or its drive shaft 31.

It is also worthy to note here that relative movement involving an increase to the pitch or grip of the belt is imparted by means of a pushing force, rather than a pulling force.

This power transmission arrangement 34 is particularly useful for transmission of belt drive to shafts in regions where width restrictions may be imposed in order to meet overall width limits, for example to drive the beater drum 30. Among the advantages of the disclosed arrangements is the ability to provide sheave movement mechanisms which are adapted for use in narrow spaces and may comprise part of a continuously and/or infinitely variable transmission. Such a transmission may be used in a drive arrangement of an agricultural machine such as a combine harvester or forage harvester and may be positioned alongside a frame member 100, 100A such that the control rod 70 runs in between the frame member or panel and the sheave variator. This saves width and makes best use of available space, at the same time protecting the actuator mechanism 44, 44A from damage that might arise if it were to be positioned further outboard. In addition, there is no hydraulic supply used, which further helps to keep down costs associated with structure, servicing and leakage.

In a second aspect of the utility vehicle of FIGS. 1 and 2, an arrangement is provided which, among its contributions to the art, addresses the problem of belt slip in variators. Referring now in particular to FIGS. 1, 2 and 5 to 8B, a variator sheave assembly 200 is illustrated which is suitable for use in belt drive power transmission in a utility machine, for example in the drive train of the combine harvester 10 illustrated in FIGS. 1 and 2. Such variators may be used for driving crop handling (conveying or processing) components or for providing forward drive to the vehicle wheels.

As discussed above, the combine harvester 10 includes a prime mover that may be in the form of a diesel engine 12 adapted to operate at a substantially constant speed and to vary its output torque to the meet the demand of a plurality of belt and/or chain drives powered off a directly driven engine output pulley 14. Torque output of the engine 12 may be controlled by varying its fuelling. The belt/chain drives are disposed in substantially vertical planes, such that gravity does not pull the belts/chains off their drive wheels, which may be pulley wheels or sprockets respectively as the case may be.

A fixed diameter pulley wheel 16 is drivingly connected to an intermediate shaft 17 and is supplied with drive from the engine output pulley 14 via an intermediate drive belt 18, tensioned by an intermediate drive belt idler 20. Drive to an upper shaft 22 of a feeder mechanism 24 is taken off the intermediate pulley 16 via a feeder input drive belt 26, tensioned by a feeder input drive belt idler 28. Also driven off the intermediate shaft pulley 16 is a shaft 31 of a beater drum 30, having a beater shaft end 206 to which drive is provided by a power transmission arrangement 34. This arrangement is a variator drive comprising a drive belt 32, a first variator sheave assembly 40, driven by the intermediate shaft 17, and a second variator sheave assembly 200, driving the beater drum shaft 31.

The variator assembly 200 includes a first sheave 202 supported on a hub 204 held in a fixed relationship to the beater shaft end 206 by a key 205. A second and moveable sheave 208 is supported on a sleeve 210 that is received through the hub 204 and can rotate within a limited arc with respect to the first sheave 202. The first and second sheaves 202, 208 include respective first and second opposing surfaces 212, 214 which may be generally conical and may define a belt groove 216 and against which in use the drive belt 3232 runs.

The pitch imparted to the belt is controlled by changing the belt pitch on the first variator assembly 40 through the actuator mechanism 44. The pitch and grip imparted to the belt 32 are directly related to the separation of the surfaces 212, 214 and the force used to close them. When the sheaves 212, 214 are closest 220, the groove 216 is narrowest and the belt pitch is highest, as illustrated in the top half of FIG. 5. When the sheaves 212, 214 are widest 222, the groove 216 is widest 222 and the pitch is lowest, as illustrated in the lower half of FIG. 5. Variation of the belt pitch, and therefore transmission ratio, is substantially infinite between the widest and narrowest groove widths 220, 222 and can be performed substantially continuously by relative movement of the sleeve 210 and therefore of the moveable sheave 208.

A minimal, predetermined level of belt grip is achieved between the opposing conical surfaces 212, 214 of the sheaves 202, 208 by biasing the moveable sheave 208 towards the fixed sheave 202. The bias is achieved using a bias means in the form of a helical spring 224 pre-loaded by compression between an end cap 226 and a bias face 228 of the moveable sleeve 210.

Figure 9:
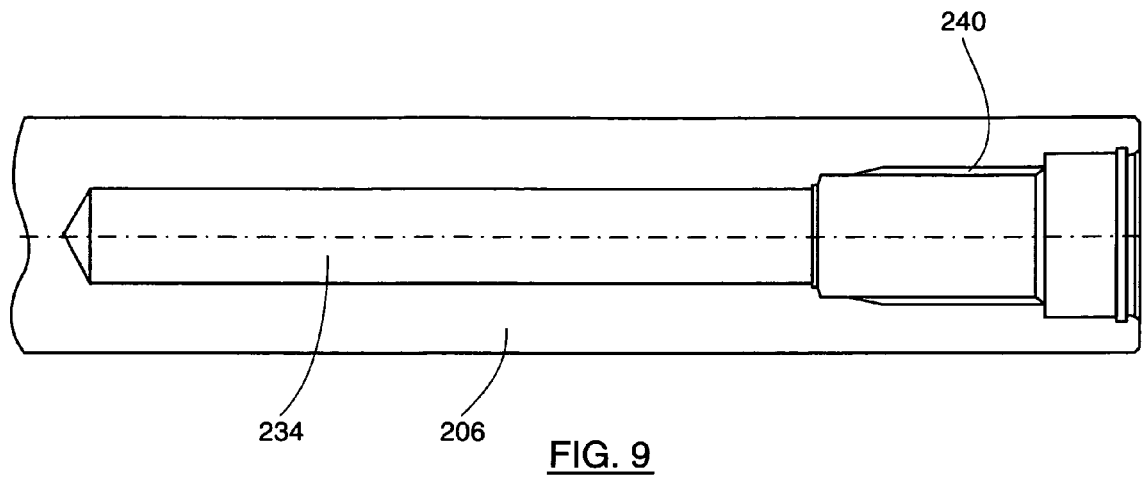
FIG. 9 is a section through part of the apparatus of FIG. 5.
Figure 10:
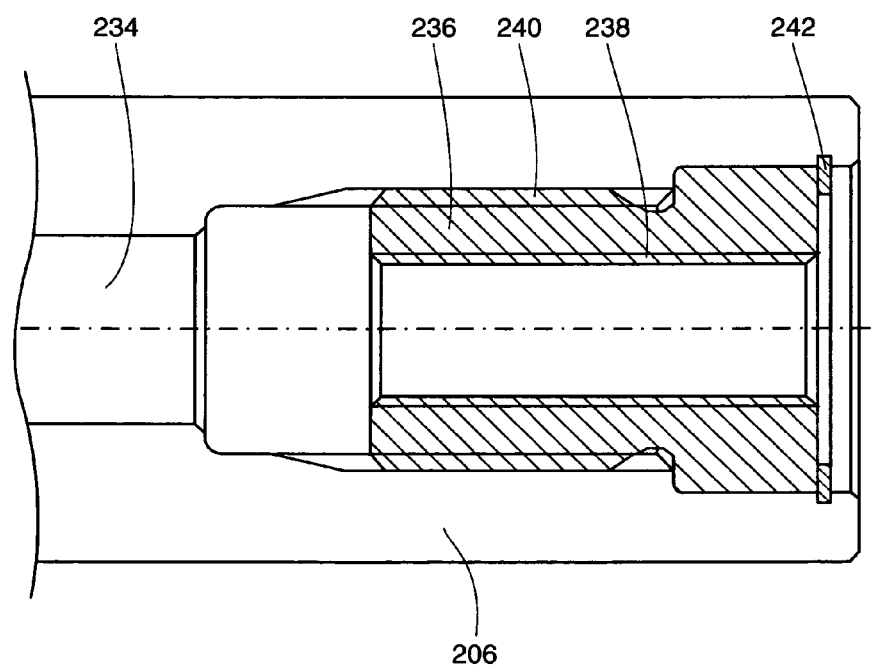
FIG. 10 is a partial view of that depicted in FIG. 9 illustrating part of the arrangement in greater detail.

The pre-load is applied by using a threaded compressor 230, engaged in a thread 232 in the shaft end 206. Referring for the moment in particular to FIGS. 5, 9 and 10, the spring compressor 230 comprises a high tensile steel machine screw whose major diameter is below the diameter of an associated clearance hole 234 that is machined into the shaft end 206 and through the end cap 226. The compressor 230 engages with a threaded insert 236 in the clearance hole 234, the insert inner thread 238 being complementary to the thread of the compressor 230 and the insert 236 having an outer thread 240 which engages with a complementary thread formed from the shaft part way along the clearance hole 234. The insert 236 is captured in place in the clearance hole 234 by a captive fixing, such as an internal circlip 242. It will be appreciated that the insert 236 could be captured against winding itself out of the clearance hole 234 in other ways, such as by using a thread locking agent or spot welding.

The use of a clearance hole 234 and a threaded insert 236 is advantageous over merely trying to tap a hole for the compressor 230. This is because trying to produce a thread throughout a long blind hole, e.g. a hole longer than five times the thread diameter, may suffer from problems in clearing swarf during tapping. In addition, a longer thread is more likely to cause problems with jamming through swarf or contamination getting in during disassembly for maintenance, where an insert 236 would also be found easier to change in the event of cross threading.

Referring now to FIGS. 5 to 8B, the variator assembly 200 includes a torque dependent pressure device. This includes two main structural components, in the form of a wedge or cam-like member 250 connected to the sleeve 210 of the moveable sheave 208 and a track member 252 disposed on the hub 204 connected to the stationary sheave 202. The wedge member 250 comprises a pair of angled cam-like wedges 254 adapted, in the event of belt slippage, to move along wedge tracks 256 defined in the track member 252. Belt slippage causes relative rotation between the sheaves 202, 208 and the wedge or cam action forces said sheaves 202, 208 axially towards each other and thereby increases grip on the belt 32. The wedge member 250 and the track member 252 are substantially enclosed within the variator assembly 200 in a casing 270, so as to protect them from environmental hazards, such as contamination from grease and dust.

Figure 8A:
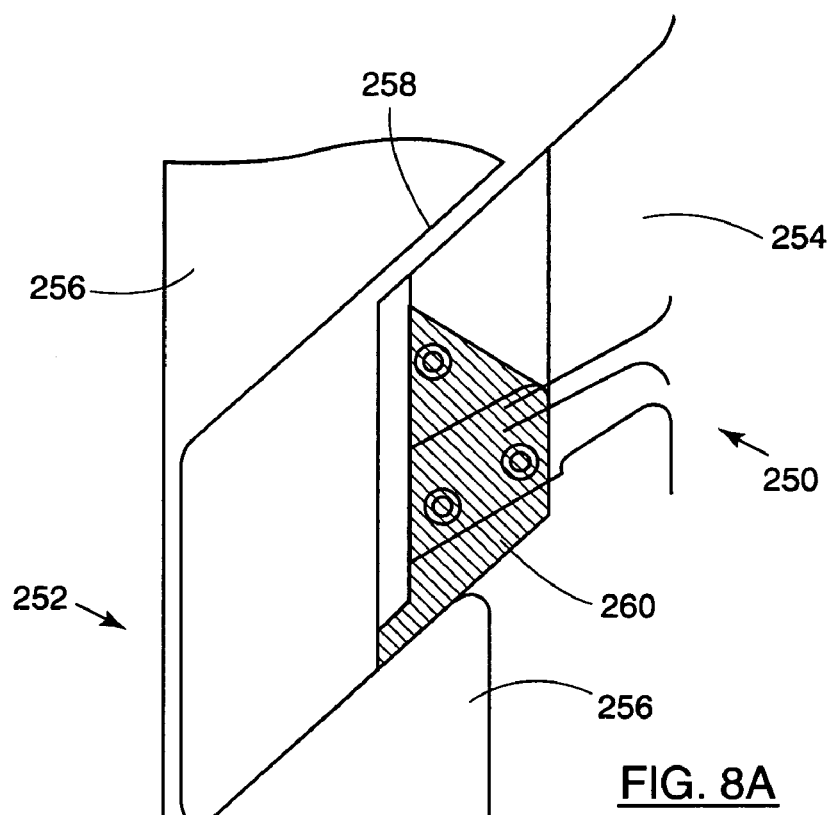
FIG. 8A is a plan view of the parts depicted in FIGS. 6 and 7 in a first state of co-operation.
Figure 8B:
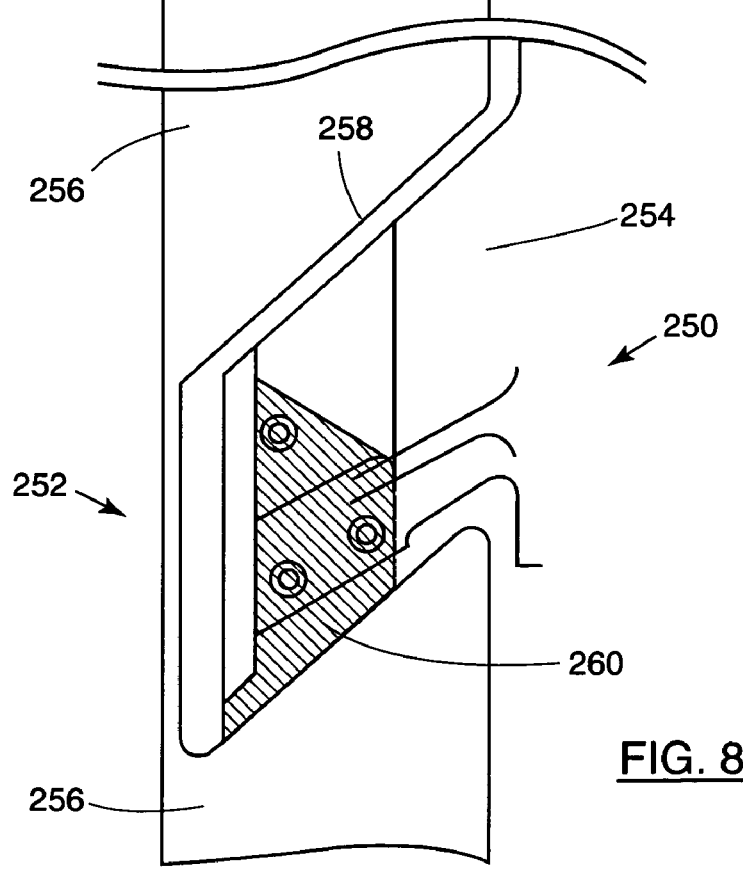
FIG. 8b is a plan view of the parts depicted in FIGS. 6 and 7 in a second state of co-operation.

As can be seen best from FIGS. 8A and 8B, the wedges 254 are substantially complementary to the tracks 256 with little clearance to an abutment surface 258 defining the rear of the track 256, whereby backlash is kept to a minimum and the potential for shock correspondingly reduced. As slip occurs during an increase in torque transmission, the friction of the belt side surfaces rotates the moveable sheave 208 relative to the stationary sheave 202, such that the wedges 254 ride up the tracks 256 between the open position illustrated in FIG. 8A and the closed position illustrated in FIG. 8B. Simultaneously the sheaves 202, 208 move axially towards each other and increase grip on the belt 32. In the event of a decrease in torque transmission, the wedge members 254 can ride back down the tracks 256 and thereby relax grip on the belt 32 and allow the sheaves 202, 208 to be moved apart.

The wedge members 254 and said wedge tracks 256 are substantially enclosed in the casing 270, which is defined within the power transmission device by the sheaves 202, 208, sleeve 210 and hub 204. It will be appreciated that in alternative embodiments the space 272 within the casing 270 could be defined by one or more of the components 202, 204, 208, 210 used by way of example in the specific embodiment illustrated. The primary function of the casing 270 is to protect the wedge members from environmental hazards such as dust and grease, but offers the additional advantage of enabling lubrication to be supplied to the contact areas between the wedges and tracks and thereby to increase service life. To reduce friction and wear between the wedges 252 and the tracks 256 and to maintain tensioning characteristics, a number of measures are taken. As the wedges 252 and tracks 256 are substantially enclosed in the variator sheave assembly 200, they can be lubricated in common with the sleeve 210. The same hub grease or oil is used, being recycled after lubricating the contact surface of the hub 204 and the sleeve 210 by being thrown outwards by centrifugal force onto the tracks 256 and onto the wedges 254.

A second anti friction measure taken may be the provision of a wear pad 260 on each wedge member 254, preferably a replaceable wear pad. The wear pads 260 preferably comprise a polyacetol material or similar/equivalent.

Whether employing direct contact or a wear member 260, the angle of slope of a contact region between the wedge member 254 and the wedge track 256 is substantially constant and defines the rate of increase in belt grip with respect to torque being transmitted. The angle of slope is configured in a predetermined relationship with respect to an operating range of belt pitch variation achievable in use between said first and second sheaves 202, 208. By this, the amount by which the sheaves 202, 208 are closed or the grip on the belt 32 tightened is kept within limits that prevent premature wear damage through excess side loading of the belt 32. It can also be noted that the cam action of the torque sensitive pressure device closes the sheaves 202, 208 by a pulling action from inside the variator sheave assembly 200, rather than by pushing the moveable sheave 208 towards the stationary sheave 202.

Figure 11:
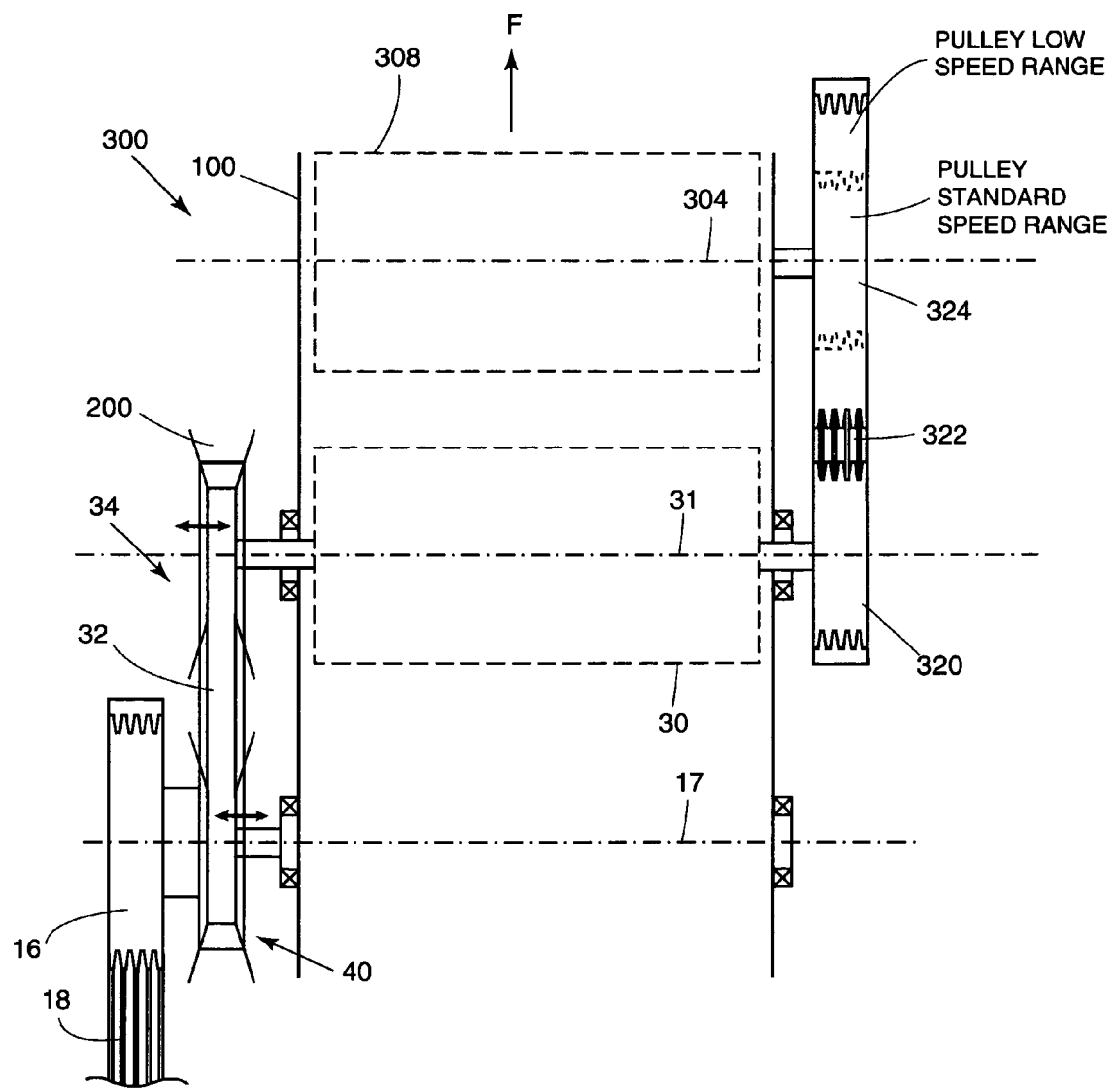
FIG. 11 is a schematic representation of an aspect of power transmission in the utility machine of FIG. 1.

In a third aspect to the utility vehicle of FIGS. 1 and 2, an arrangement is provided which, among its contributions to the art, provides belt drive to multiple shafts whilst retaining the ability to change fixed diameter pulleys easily. Referring now in particular to FIGS. 1, 2 and 11, the combine harvester 10 includes a prime mover in the form of a diesel engine 12. The engine 12 is adapted to operate at a substantially constant speed and to vary its output torque to the meet the demand of a plurality of belt and/or chain drives powered off a directly driven engine output pulley 14. Torque output of the engine 12 is controlled by varying its fuelling. The belt/chain drives are disposed in substantially vertical planes, such that gravity does not pull the belts/chains off their drive wheels, which may be pulley wheels or sprocket wheels respectively as the case may be.

A fixed diameter pulley wheel 16 is drivingly connected to an intermediate shaft 17 and is supplied with drive from the engine output pulley 14 via an intermediate drive belt 18, tensioned by an intermediate drive belt idler 20. Drive to an upper shaft 22 of a feeder mechanism 24 is taken off the intermediate pulley 16 via a feeder input drive belt 26, tensioned by a feeder input drive belt idler 28.

The fixed diameter pulley wheel 16 further comprises the drive input to a drive transmission arrangement 300 that includes a plurality of shafts 31, 304 adapted to operate materials handling equipment, e.g. by driving a series of drums 308, 30 for crop processing in tangential flow. It is useful to note that tangential flow comprises processing material tangentially and often rearwards to drums or shafts that are disposed transverse to the direction of travel used for materials gathering.

The engine driven pulley wheel 16 is outboard on the intermediate shaft 17 of a variator sheave assembly 40 that is drivingly connected to the intermediate shaft 17 and that is adapted to translate drive from the pulley wheel 16 to a drive belt 32 trained around a further variator assembly 200. This variator assembly 200 is drivingly connected to a beater shaft 31 that runs transverse to the combine harvester 10 and that is adapted to drive a beater drum 30.

The intermediate shaft variator assembly 40 comprises a positionally fixed sheave 56 outboard and a moveable sheave 50 inboard, whereas the beater variator assembly 200 comprises a fixed inner sheave 202 and a moveable outer sheave 208. By moving opposite sides of the variators, belt alignment is substantially maintained in all axial positions of the moveable sheave of each variator at working speeds and therefore belt twist is kept to a minimum. A typical speed for the intermediate shaft 17 is 800 rpm and a typical speed for the beater shaft 31 is 420 to 1200 rpm.

On the end of the beater shaft 31 opposite to the end 206 carrying the beater variator assembly 200, i.e. on the other side of the combine harvester 10, a fixed diameter beater shaft pulley 320 is drivingly attached to the beater shaft 206. A thresher drum drive belt 322 is trained around the beater shaft pulley 320 and provides drive to a fixed diameter thresher shaft pulley 324 at a fixed ratio. The thresher shaft pulley 324 is drivingly connected to a thresher drum shaft 304, adapted itself to drive a thresher drum 308. Either or both of the beater shaft and thresher shaft pulleys 320, 324 are removable and may be interchanged with each other or other fixed diameter pulleys so as to vary the speed range of the thresher drum 308. It is deemed adequate, at least in some base models, to provide for two speed ranges in the thresher drum 308 and this can be achieved by changing only the thresher shaft pulley 324. Typical speed ranges for the thresher drum 308 are 400 to 1194 rpm in standard ratio and 240 to 715 rpm in low ratio.

Using an arrangement according to the present invention enables useful speed ranges to be achieved for thresher drums 308, or equivalent materials handling equipment, without the need for a variator or a gearbox in the drive between the beater shaft 31 and the thresher shaft 304. The disposition of the pulleys and variators keeps down stacking of pulleys and/or variators and therefore allows easy access to the thresher shaft pulley 324 for change of speed ranges. Only one belt has to be removed and reinstalled.

The intermediate shaft variator 17 may comprise a variator of the structure and control described above with particular reference to FIGS. 1 to 4. The beater variator assembly 200 may comprise a variator of the structure and control described above with particular reference to FIGS. 1, 2 and 5 to 10.

Figure 12:
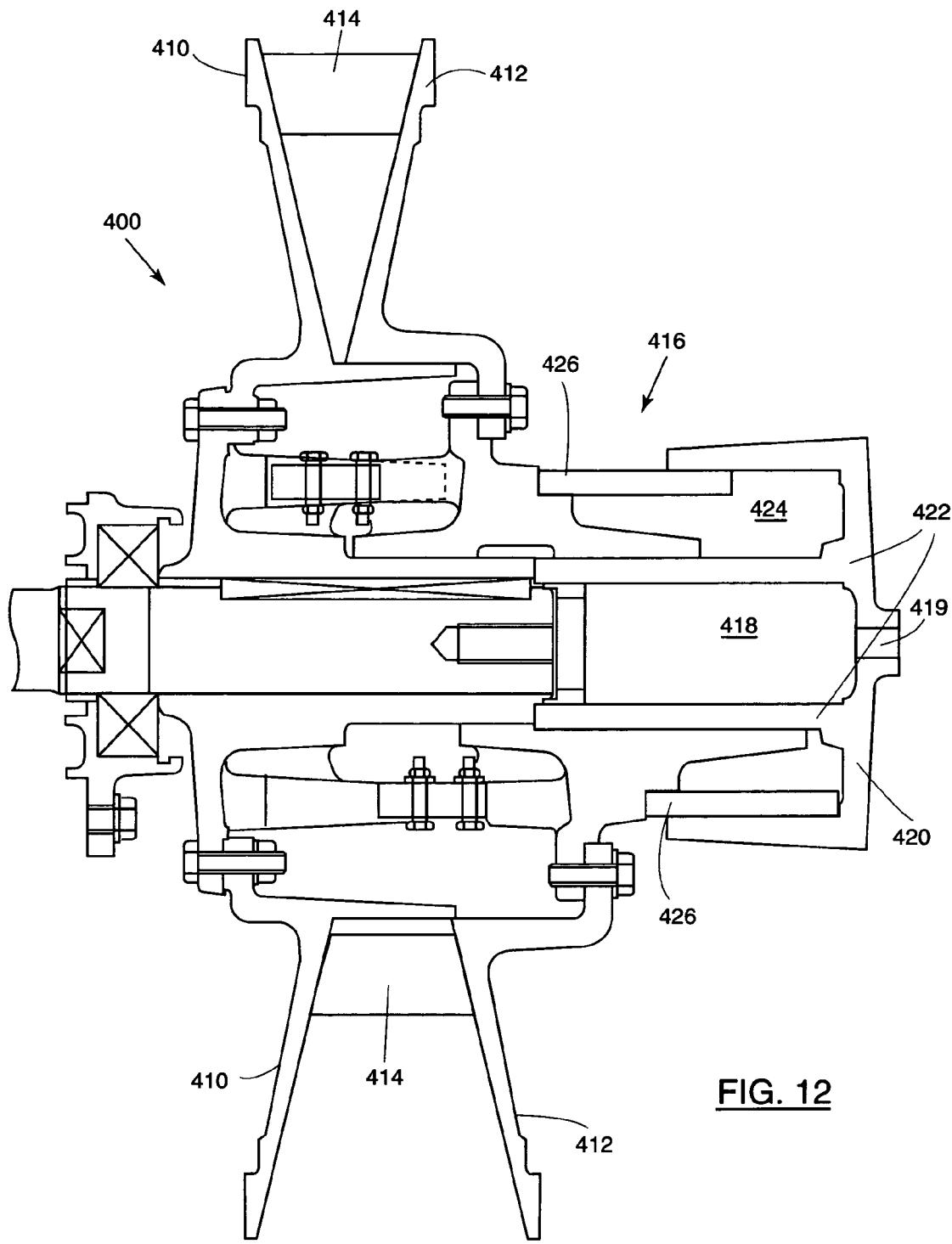
FIG. 12 is a section through a power transmission device according to a further aspect of the present invention.

An alternative variator structure is disclosed with particular reference now to FIG. 12. This variator 400 comprises a fixed sheave 410 and a moveable sheave 412. Rather than using a spring to provide grip to a belt 414, this feature is replaced by a compressed air ram 416. The ram 416 comprises an accumulator 418 that is selectively filled with compressed air through a feed defined through an end cap 420. Feed holes 422 from the accumulator 418 supply compressed air into an annular chamber 424, the chamber being sealed by a rigid and cylindrical sealing member 426 adapted to slide in an out of the chamber and allow relative movement between the sheaves 410, 412 as compressed air is supplied and released.

While the present invention has been particularly shown and described with respect to a preferred embodiment, it will be understood by those skilled in the art that changes in form and detail may be made without departing from the scope of the invention as defined by the accompanying claims.

The invention claimed is:

1. A method of varying the pitch or grip of a belt running between a pair of opposing faces of respective first and second sheaves of a power transmission device, the method including:
    interconnecting the second sheave to an annular thrust member, the thrust member axially sliable along a shaft for moving the second sheave;
    providing a boss on a control rod rotatable about an axis generally perpendicular to shaft, the boss travelling axially along the control rod in response to rotation of the control rod;
    pivotably connecting a first end of a link to the thrust member and a second end of the link to the boss;
    wherein rotation of the control rod causes linear movement of the second sheave axially in relation to said first sheave.

2. The method of claim 1 further comprising the additional steps of connecting a first end of a swinging arm to the link and fixing a second end of the swinging arm to shaft.

3. The method of claim 2 wherein the step of fixing the second end of the swinging arm to shaft includes the additional steps of fixing a fulcrum to the shaft and pivotably connecting the second end of the swinging arm to the fulcrum.

4. The method of claim 3 comprising the additional step of axially aligning the fulcrum with the control rod.

5. The method of claim 1 comprising the additional step constraining the path of the link to a predetermined curvilinear path.

* * * * *